March 29, 1966 M. E. LEVY ETAL 3,242,864
CARTRIDGE WITH IMPROVED VIBRATION RESISTANCE
FOR PROPELLANT ACTUATED DEVICES
Filed June 16, 1964
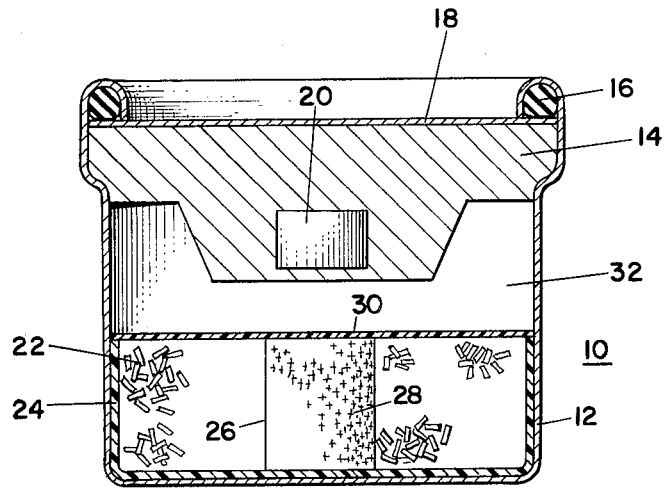
INVENTORS.
MARVIN E. LEVY
JOSEPH B. QUINLAN
WILMER WHITE
EARL F. Van ARTSDALEN
BY: Harry M. Saragovitz,
Edward J. Kelly,
Herbert Berl &
S. Pubrott
ATTORNEYS.

United States Patent Office 3,242,864
Patented Mar. 29, 1966

3,242,864
CARTRIDGE WITH IMPROVED VIBRATION RESISTANCE FOR PROPELLANT ACTUATED DEVICES
Marvin E. Levy and Joseph B. Quinlan, Philadelphia, Pa., Wilmer White, Haddonfield, N.J., and Earl F. Van Artsdalen, Philadelphia, Pa., assignors to the United States of America as represented by the Secretary of the Army
Filed June 16, 1964, Ser. No. 375,675
2 Claims. (Cl. 102—39)

The invention described herein may be manufactured and used by or for the government for governmental purposes without the payment to us of any royalty thereon.

This invention relates generally to propellant actuated devices and more particularly concerns cartridges for initiators having excellent vibration resistance.

With the employment of propellant actuated device systems in the rocket and missile field, even more vigorous vibration requirements than those stipulated for aircraft were necessitated. Conventional propellant actuated device cartridges, loaded with loose propellant and igniter, are adversely affected by severe vibration conditions resulting in detrimental changes in the physical properties of the gas producing constituents or ballistic performance. An earlier attempt to improve vibration resistance of the cartridge involved the use of a star-shaped polyethylene insert for separating the loose multiperforated propellant grains. Additionally, the black powder igniter charge contained in the cartridge was encased in a small polyethylene capsule. While this system was capable of meeting the large amount of inert material present in the cartridge was highly undesirable and the ballistic performance was adversely affected.

It is therefore a broad object of this invention to provide a propellant actuated device which overcomes the aforementioned disadvantages.

Another object of this invention is to provide a cartridge possessing excellent vibration resistance properties and yet functioning in the rapid ballistic cycle required in diverse propellant actuated device applications.

The exact nature of this invention as well as other objects and advantages thereof will be readily apparent from consideration of the following specification relating to the single figure of the drawings which illustrates a longitudinal section through a preferred embodiment of our inventive device.

Briefly, and in accordance with the aforementioned objects, our invention comprises a cartridge having an integrated molded propellant charge therein with a diameter of the metal cartridge case and bonded thereto. An ignition booster is contained within the molded propellant and means are employed for containing the ignition charge.

More specifically, and with reference now to the drawing, there is shown a cartridge 10 for use within an initiator (not shown) having a metallic case 12 and head 14, both preferably of aluminum, O-ring 16, sealing disc 18 and primer 20, all of which are well known in the art.

Within the case is an integrated molded propellant charge 22 having a diameter substantially equal to the inside diameter of case 12 and bonded 24 to the case wall with a solution of cellulose acetate in an equal volume mixture of acetone and ethyl alcohol, the concentration of the cellulose acetate solution not being critical. The thickness of the bond will preferably be in the neighborhood of about 0.0015 to 0.0020 inch thick.

Our integrated molded propellant charge 22 will conveniently be cyclotrimethylenetrinitramine-cellulose acetate (hereinafter referred to as RDX-CA) although not necessarily limited thereto since other propellants such as ammonium perchlorate-cellulose acetate, for example, have been found to work well. The proportion of RDX-CA may vary but we have determined that 77% by weight of RDX to 23% by weight of CA yielded admirable results.

The RDX-CA grains are placed in a steel mold to which a quantity of a binder made from about 5% by weight of a low nitrogen nitrocellulose is dissolved in about 95% by weight of a 50–50 solution of ethyl alcohol and ethyl ether. After thorough mixing of the binder with the RDX-CA, additional grains of propellant are added thereto and more binder, and so on until the desired quantity is produced. The resultant mass is then subjected to a pressure of about 1700 p.s.i. for such a duration until excess binder has flowed from the mold. The molded mass may then be removed from the mold and dried for about 16 hours at about 50 degrees centigrade. The dried mass is next machined to proper diameter and to form central recess 26 therein for containing black powder ignition booster 28. A disc 30 of cellophane tape, for example, about 0.003 inch thick, is placed over the molded propellant and black powder to prevent the loose black powder from flowing into the air space 32 between the top of the molded charge and the base of the head.

The cartridge illustrated will have a case diameter of about 0.640 inch, a molded propellant height of about 0.375 inch and a central recess of about 0.281 inch. It will be understood, of course, that our invention is not limited to any specific dimensions.

Cartridges made in accordance with our invention were subjected to a modified, more vigorous vibration schedule than that required for USAF testing (Military Specification MIL–E–5272C (ASG), "Environmental Testing, Aeronautical and Associated Equipment, General Specification for," April 13, 1959.

For comparison, standard cartridges were tested along with our inventive cartridges and all were subjected to a vibration frequency cycled between 5 and 74 c.p.s. at an applied double amplitude of 0.036 inch and to an applied acceleration of ± 10 g cycled between 75 and 500 c.p.s. The following schedule was employed:

| Direction | Time (hr.) at— | | |
|---|---|---|---|
| | −54° C. | 21° C. | 93° C. |
| Vertical | 15 | 15 | 15 |
| Horizontal | 15 | 15 | 15 |

While the standard requirements call for a total vibration time of nine hours, the above cartridges were subjected to 90 hours' vibration.

Upon examination after vibration, it was determined that our inventive cartridges did not break up or dislodge the case bonded integrated charges, nor was the black powder in the perforation dislodged.

In the standard cartridges however, a portion of the loose flowing black powder deposited on the surface of the propellant grains, while most of the balance agglomerated into several large pieces. The appearance of the black powder suggested that it had first been pulverized probably by impact with both the loose propellant grains and the metal case.

Additionally, our remaining vibrated cartridges were tested for ballistic performance including peak pressure, ignition delay and rise time. Even after vibration at ninety hours under the aforementioned conditions, our cartridges proved most satisfactory.

We claim:
1. In a cartridge of the class wherein a metallic casing contains a head, O-ring, sealing disc and primer, said cartridge finding use in initiators, propellant actuated devices and the like, and having high vibration resistance and operable in temperatures ranging between about

—54° C. to 93° C., the improvement in said cartridge comprising a molded integrated propellant of cyclotrimethylenetrinitramine/cellulose acetate in a weight proportion of about 77/23 within said casing, a central core of ignition booster disposed longitudinally within said propellant and in communicating relation with said primer, a plastic bond around said propellant for securement therewith to inner walls and bottom of said casing and a disc adherently mounted on said ignition booster.

2. In a cartridge of the class wherein a metallic casing contains a head, O-ring, sealing disc and primer, said cartridge finding use in initiators, propellant actuated devices and the like, and having high vibration resistance and operable in temperatures ranging between about —54° to 93° C. the improvement in said cartridge comprising a molded integrated propellant within said casing, a central core of ignition booster disposed longitudinally within said propellant and in communicating relation with said primer, a plastic bond comprising a solution of cellulose acetate dissolved in an equal volume mixture of acetone and ethyl alcohol around said propellant for securement therewith to inner walls and bottom of said casing and a disc adherently mounted on said ignition booster.

References Cited by the Examiner
UNITED STATES PATENTS

| | | | |
|---|---|---|---|
| 2,299,465 | 10/1942 | Coffman | 102—39 |
| 2,667,837 | 2/1954 | Musser et al. | 102—39 |
| 2,916,996 | 12/1959 | Coffee | 102—39 |
| 2,921,521 | 1/1960 | LaHaye et al. | 102—39 |
| 2,926,607 | 3/1960 | Muller et al. | 102—39 |
| 2,987,388 | 6/1961 | Stanley | 102—98 |
| 3,173,817 | 3/1965 | Wright | 149—92 |

SAMUEL FEINBERG, *Primary Examiner.*

BENJAMIN A. BORCHELT, *Examiner.*

R. F. STAHL, *Assistant Examiner.*